United States Patent
Lee et al.

(10) Patent No.: US 8,284,243 B2
(45) Date of Patent: Oct. 9, 2012

(54) STEREOSCOPIC IMAGE DISPLAY APPARATUS

(75) Inventors: Seung-Hoon Lee, Yongin-si (KR); Kyoung-Ju Shin, Hwaseong-si (KR); Hae-Young Yun, Suwon-si (KR); Sung-Woon Kim, Suwon-si (KR); Lu Jian Gang, Suwon-si (KR)

(73) Assignee: Samsung Display Co., Ltd., Yongin-city (KR)

( * ) Notice: Subject to any disclaimer, the term of this patent is extended or adjusted under 35 U.S.C. 154(b) by 526 days.

(21) Appl. No.: 12/464,434

(22) Filed: May 12, 2009

(65) Prior Publication Data

US 2010/0013912 A1 Jan. 21, 2010

(30) Foreign Application Priority Data

Jul. 15, 2008 (KR) .................................. 2008-68567

(51) Int. Cl.
*H04N 13/04* (2006.01)
*G02B 27/22* (2006.01)

(52) U.S. Cl. .......... 348/59; 359/463; 358/496; 358/509; 358/471; 358/487; 358/506; 358/497; 358/474; 358/505

(58) Field of Classification Search .................... 348/59, 348/463, 75
See application file for complete search history.

(56) References Cited

U.S. PATENT DOCUMENTS

| | | | |
|---|---|---|---|
| 4,763,142 A * | 8/1988 | Saitoh et al. .................. | 347/136 |
| 6,064,424 A | 5/2000 | van Berkel et al. | |
| 6,118,584 A | 9/2000 | Van Berkel et al. | |
| 7,483,106 B2 * | 1/2009 | Ito et al. ........................ | 349/141 |
| 2002/0159106 A1 * | 10/2002 | Fuchigami et al. ........... | 358/518 |
| 2007/0242068 A1 * | 10/2007 | Han et al. ...................... | 345/427 |
| 2008/0117231 A1 * | 5/2008 | Kimpe .......................... | 345/629 |

* cited by examiner

*Primary Examiner* — Jude Jean Gilles
(74) *Attorney, Agent, or Firm* — H.C. Park & Associates, PLC

(57) ABSTRACT

A stereoscopic image display apparatus includes a display panel and an image conversion sheet. The display panel includes a plurality of pixel units. Each pixel unit has a zigzag shape that extends in a first direction. The image conversion sheet includes a plurality of lens units. Each lens unit extends in the first direction and is disposed in a second direction different from the first direction. A plurality of the lens units is disposed in parallel with each other.

17 Claims, 9 Drawing Sheets

STEREOSCOPIC IMAGE DISPLAY APPARATUS

CROSS REFERENCE TO RELATED APPLICATION

This application claims priority from and the benefit of Korean Patent Application No. 2008-68567, filed on Jul. 15, 2008, which is hereby incorporated by reference for all purposes as if fully set forth herein.

BACKGROUND OF THE INVENTION

1. Field of the Invention

The present invention relates to a stereoscopic image display apparatus. More particularly, exemplary embodiments of the present invention relate to a stereoscopic image display apparatus of a lenticular type.

2. Discussion of the Background

Stereoscopic image display apparatuses for displaying a three-dimensional (3-D) stereoscopic image have been developed according to an increase in demand for 3-D stereoscopic images in the fields of games, movies, etc. To display the 3-D stereoscopic image, the stereoscopic image display apparatus may display two-dimensional (2-D) flat images that are different from each other to a viewer's eyes. A viewer may view a pair of 2-D flat images with one image being displayed to each eye, and then the brain merges the pair of 2-D flat images for the viewer to view the stereoscopic image.

Stereoscopic image display apparatuses may be classified as either a stereoscopic type or an autostereoscopic type, according to whether or not the viewer is required to wear glasses for viewing the stereoscopic image. Generally, an autostereoscopic image display apparatus, such as a barrier type, a lenticular type, etc., does not require viewing glasses, and is generally used in a flat panel display apparatus.

In the barrier type autostereoscopic image display apparatus, light emitted from a left pixel and a right pixel is blocked or transmitted using a parallax barrier to control a viewing angle, so that a viewer's left eye views the left pixel and a viewer's right eye views the right pixel. Thus, a stereoscopic image may be displayed. In the lenticular type autostereoscopic image display apparatus, the light emitted from the left pixel and the right pixel is refracted using a lens to control a viewing angle, so that the stereoscopic image may be displayed.

In the barrier type, since the light is partially blocked, the luminance may be decreased by about 50%$_1$ thereby deteriorating the display quality. However, in the lenticular type, most of the light passes through the lens, so that decreased luminance may be minimized compared to the barrier type.

In the lenticular type, the lens includes a vertical lens and a slanted lens according to the location relationship of a lens axis with respect to a display panel. The lens axis of the vertical lens is perpendicular to the display panel, and thus the vertical lens may be easily mass-produced and the stereoscopic image display apparatus may be easily manufactured. However, the luminance of the display panel having the vertical lens may not be uniform throughout the entire display panel, so that the display quality may be deteriorated.

The luminance of the display panel having the slanted lens may be greater than that of the display panel using the vertical lens. However, the manufacturing process of the slanted lens may require high reliability since the lens axis of the slanted lens must be slanted with respect to the display panel. In particular, when a multi-viewpoint stereoscopic image is displayed on the display panel using the slanted lens, crosstalk may be generated between adjacent viewpoints, thereby deteriorating the display quality.

SUMMARY OF THE INVENTION

The present invention provides a stereoscopic display apparatus that may improve display quality by minimizing the generation of crosstalk and increasing luminance uniformity.

Additional features of the invention will be set forth in the description which follows, and in part will be apparent from the description, or may be learned by practice of the invention.

The present invention discloses a stereoscopic image display apparatus that includes a display panel and an image conversion sheet. The display panel includes a plurality of pixel units. Each of the pixel units has a zigzag shape extending in a first direction. The image conversion sheet includes a plurality of lens units. Each of the lens units extends in the first direction. The lens units are arranged in a second direction different from the first direction. The lens units are disposed in parallel with each other.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
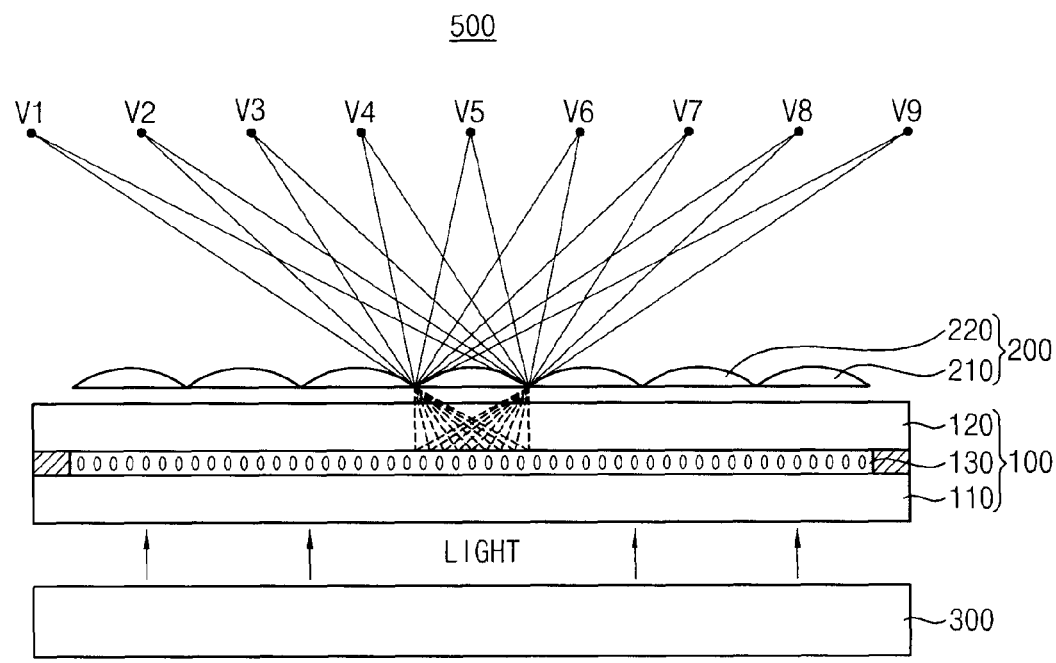
FIG. 1 is a cross-sectional view showing a stereoscopic image display apparatus in accordance with an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

The terminology used herein is for the purpose of describing particular exemplary embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Exemplary embodiments of the invention are described herein with reference to cross-sectional illustrations that are schematic illustrations of idealized exemplary embodiments (and intermediate structures) of the present invention. As such, variations from the shapes of the illustrations as a result, for example, of manufacturing techniques and/or tolerances, are to be expected. Thus, exemplary embodiments of the present invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a cross-sectional view showing a stereoscopic image display apparatus in accordance with an exemplary embodiment of the present invention.

Referring to FIG. 1, a stereoscopic image display apparatus 500 in accordance with an exemplary embodiment of the present invention includes a display panel 100, an image conversion sheet 200, and a backlight assembly 300.

The display panel 100 includes a display substrate 110, an opposite substrate 120, and a liquid crystal layer 130 disposed between the display substrate 110 and the opposite substrate 120. An image is displayed on the display panel 100 according to the light transmittance of liquid crystal material, which changes according to voltage. The display panel 100 displays an image, and the display panel 100 includes a plurality of pixel units P1, P2, P3, P4, P5, P6, P7, P8, and P9 (see FIG. 2).

Figure 6:
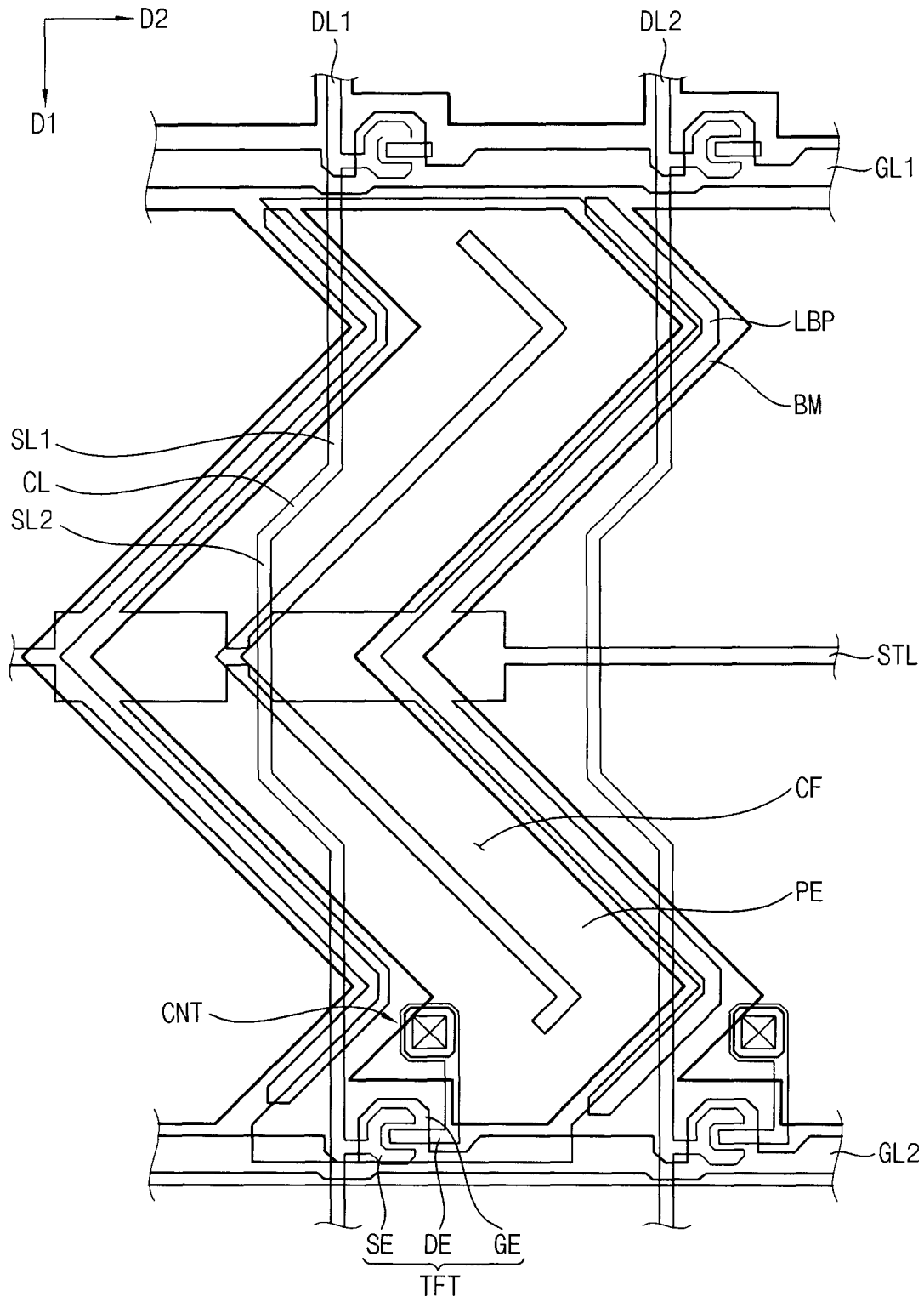
FIG. 6 is a plan view showing an exemplary embodiment in accordance with a pixel unit shown in FIG. 2.

Each pixel unit P1, P2, P3, P4, P5, P6, P7, P8, and P9 may include a switching device (see FIG. 6, TFT) connected to signal lines, a liquid crystal capacitor connected to the switching device, a storage capacitor, and a color filter (see FIG. 6, CF). A detailed structure of each of the pixel units P1, P2, P3, P4, P5, P6, P7, P8, and P9 will be described referring to FIG. 6 and FIG. 7.

The display panel 100 may receive two or more viewpoint signals to display a stereoscopic image. The viewpoint signals may be image signals that enable a viewer to view the stereoscopic image through both eyes from a fixed viewing field.

For example, in the stereoscopic image display apparatus 500 containing nine viewpoints, the viewpoint signals may be nine image signals photographing a subject having a three-dimensional structure from the nine viewpoints. The display panel 100 may display nine images different from each other using the nine image signals. The images may be space-divided by a plurality of lens units 210 of the image conversion sheet 200. Thus, a viewer may view a stereoscopic image from a plurality of viewpoints V1, V2, V3, V4, V5, V6, V7, V8, and V9.

In FIG. 1, one of the lens units 210 divides the image, which is displayed through the display panel 100 corresponding to one of the lens units 210, into nine viewpoints V1, V2, V3, V4, V5, V6, V7, V8, and V9. Each of the other lens units 210 may also divide the image into nine viewpoints V1, V2, V3, V4, V5, V6, V7, V8, and V9.

The image conversion sheet 200 may be disposed on the display panel 100. For example, the image conversion sheet 200 may be disposed on the opposite substrate 120. The image conversion sheet 200 may include a plurality of the lens units 210. Each lens unit 210 may correspond to two or more pixel units P1, P2, P3, P4, P5, P6, P7, P8, and P9.

Although not shown in the figures, a polarizing plate may be disposed on the opposite substrate 120. The image conversion sheet 200 may be disposed on the polarizing plate. A protective cover (not shown) may be disposed over the image conversion sheet 200.

The backlight assembly 300 may be disposed under the display panel 100. The backlight assembly 300 may include a light source (not shown) that provides light for the display panel 100. For example, the light source may include a fluorescent lamp, a light-emitting diode (LED), etc.

Hereinafter, the display panel 100 and the image conversion sheet 200 are fully shown referring to FIG. 2 and FIG. 3.

Figure 2:
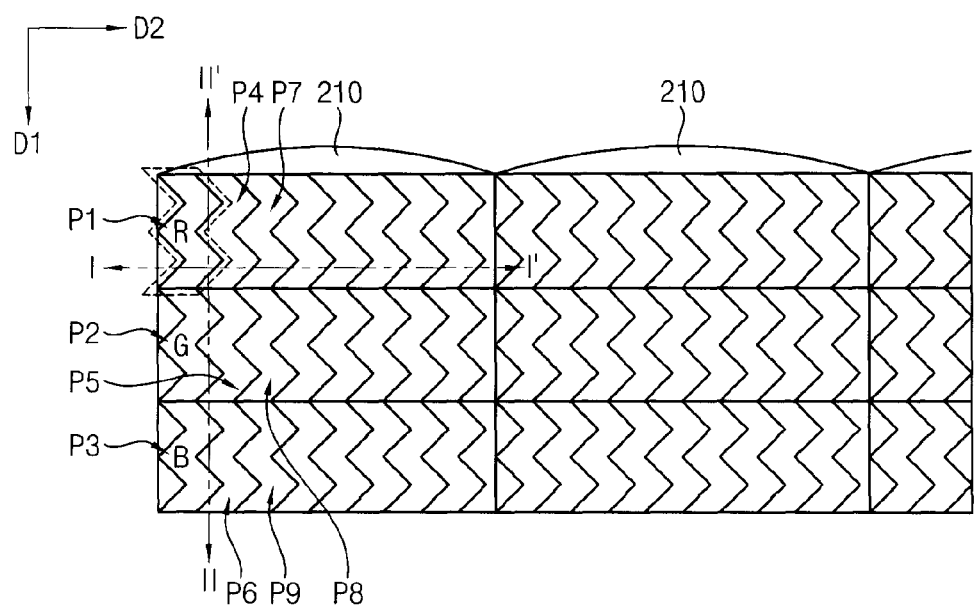
FIG. 2 is a plan view showing the stereoscopic image display apparatus in FIG. 1.

FIG. 2 is a plan view showing the stereoscopic image display apparatus 500 in FIG. 1. FIG. 3 is a cross-sectional view taken along line I-I' in FIG. 2.

Figure 3:
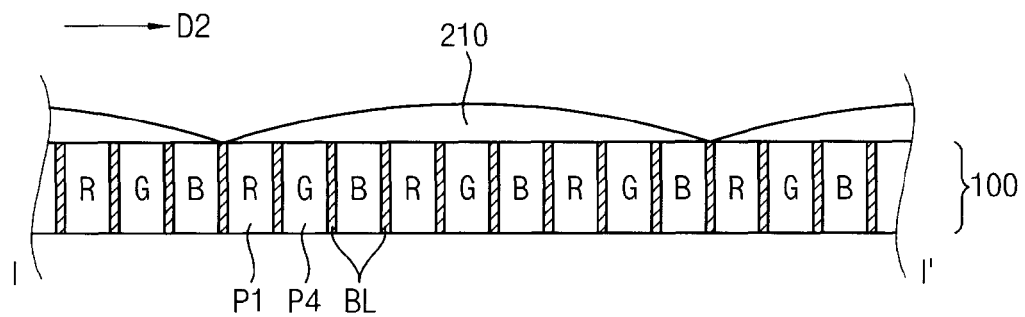
FIG. 3 is a cross-sectional view taken along line I-I' in FIG. 2.

Referring to FIG. 2 and FIG. 3, each pixel unit P1, P2, P3, P4, P5, P6, P7, P8, and P9 has a zigzag shape in a first direction D1 of the stereoscopic image display apparatus 500. For example, each pixel unit P1, P2, P3, P4, P5, P6, P7, P8, and P9 may have a W-shape. A zigzag direction may be a slanted direction based on the first direction D1. For example, the zigzag direction may be slanted at about 45° from the first direction D1.

The pixel units P1, P2, P3, P4, P5, P6, P7, P8, and P9 may be disposed parallel to each other in the first direction D1 and a second direction D2 different from the first direction D1 based on a first pixel unit P1. The second direction D2 is a direction perpendicular to the first direction D1.

A second pixel unit P2 may be disposed in the first direction D1 of the first pixel unit P1, and a third pixel unit P3 may be disposed in the first direction D1 of the second pixel unit P2. A fourth pixel unit P4 may be disposed in the second direction D2 of the first pixel unit P1. A fifth pixel unit P5 may be disposed in the first direction D1 of the fourth pixel unit P4, and a sixth pixel unit P6 may be disposed in the first direction D1 of the fifth pixel unit P5. A seventh pixel unit P7 may be disposed in the second direction D2 of the fourth pixel unit P4, an eighth pixel unit P8 may be disposed in the first direction D1 of the seventh pixel unit P7, and a ninth pixel unit P9 may be disposed in the first direction D1 of the eighth pixel unit P8.

The first to ninth pixel units P1, P2, P3, P4, P5, P6, P7, P7, P8, and P9 may include a first color pixel, a second color pixel, and a third color pixel. The first to third color pixels may represent colors different from one another.

The first color pixel may represent a first color. For example, the first color may be red. The second color pixel may represent a second color different from the first color. For example, the second color may be green. The third color pixel may represent a third color different from the first color and second color. For example, the third color may be blue.

For example, the first pixel unit P1 may serve as the first color pixel, the second pixel unit P2 may serve as the second color pixel, and the third pixel unit P3 may serve as the third color pixel. The fourth pixel unit P4 may serve as the third color pixel, the fifth pixel unit P5 may serve as the first color pixel, and the sixth pixel unit P6 may serve as the second color pixel. The seventh pixel unit P7 may serve as the second color pixel, the eighth pixel unit P8 may serve as the third color pixel, and the ninth pixel unit P9 may serve as the first color pixel.

The first to ninth pixel units P1, P2, P3, P4, P5, P6, P7, P8, and P9 may be arranged in a mosaic pattern.

Based on one of the first color pixels, for example the fifth pixel unit P5, the second pixel unit P2, which is the second color pixel, and the eighth pixel unit P8, which is the third color pixel, may be disposed to the left and to the right, respectively, of the fifth pixel unit P5. The first pixel unit P1, the fifth pixel unit P5, and the ninth pixel unit P9 as the first color pixel may be slantingly disposed with one another based on the first direction D1 or the second direction D2.

The location relationship of the first to ninth pixel units P1, P2, P3, P4, P5, P6, P7, P8, and P9 is illustrated in FIG. 2.

As shown in FIG. 3, a light-blocking pattern BL is disposed between adjacent pixel units. For example, the light-blocking pattern BL may be disposed between the first pixel unit P1 and the second pixel unit P2, and between the first pixel unit P1 and the fourth pixel unit P4. The light-blocking pattern BL is divided from the first to ninth pixel units P1, P2, P3, P4, P5, P6, P7, P8, and P9. The light-blocking pattern BL blocks light provided from the backlight assembly 300 for the display panel 100. The light-blocking pattern BL may include a black matrix pattern formed on the display panel 100.

The first to third pixel units P1, P2, and P3 are repeatedly arranged in the first direction D1 as one set. The fourth to sixth pixel units P4, P5, and P6 are repeatedly arranged in the first direction D1 as one set. Moreover, the seventh to the ninth pixel units P7, P8, and P9 are repeatedly arranged in the first direction D1 as one set.

A pattern extending in the first direction D1 and including the first to third pixel units P1, P2, and P3 may be defined as a "first pattern." A pattern extending in the first direction D1 and including the fourth to sixth pixel units P4, P5, and P6 may be defined as a "second pattern." A pattern extending in the first direction D1 and including the seventh to ninth pixel units P7, P8, and P9 may be defined as a "third pattern." The first to third patterns may alternately be arranged in the second direction D2.

Moreover, a "fourth pattern" may be disposed in the second direction D2 of the third pattern. A "fifth pattern" may be disposed in the second direction D2 of the fourth pattern. A sixth pattern, a seventh pattern, an eighth pattern and a ninth pattern may be disposed in the second direction D2 in parallel with one another. The fourth to ninth patterns may have a zigzag shape extending in the first direction D1, being substantially the same as the zigzag shape of the first to third patterns.

Each lens unit 210 in the image conversion sheet 200 may be disposed on the display panel 100 corresponding to the first to ninth patterns.

In particular, the lens unit 210 may extend in the first direction D1. A plurality of the lens units 210 may be arranged in the second direction D2. According to the zigzag shape of the first to ninth patterns, the outside portion of the first pattern and the outside portion of the ninth pattern may not correspond to both edge portions of the lens unit 210, both edge portions facing each other in the second direction D2. The outside of the first pattern and the outside of the ninth pattern each may be partially overlapped with both edge portions.

In some embodiments, the width of the lens unit 210 and the number of pixel units arranged in the second direction D2 corresponding to the lens unit 210 may be changeable according to the number of viewpoints.

For example, in a three viewpoint stereoscopic image display apparatus, a display panel may include a first pattern extending in the first direction D1 and having a zigzag shape, a second pattern disposed in the second direction D2 of the first pattern, and a third pattern disposed in the second direction D2 of the second pattern. A lens unit may be disposed on the first to third patterns corresponding to the first to third patterns. Moreover, in a twelve viewpoint stereoscopic image display apparatus, a display panel may include first to twelfth patterns. A lens unit may be disposed on the first to twelfth patterns to correspond to the first to twelfth patterns.

The number of the pixel units which are arranged in the second direction D2 may be two or more in order to ensure parallax between both eyes. The number of pixel units may be less than forty in order to optimize a resolution, which may be decreased by displaying a stereoscopic image. Thus, the number of the pixel units may be in a range of two to forty.

Figure 4:
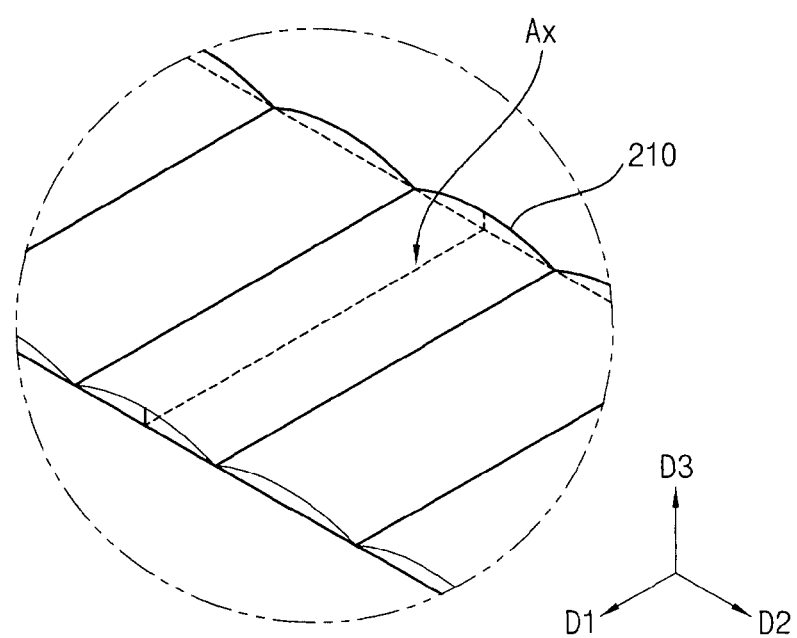
FIG. 4 is a perspective view showing the image conversion sheet shown in FIG. 2.

FIG. 4 is a perspective view showing an image conversion sheet shown in FIG. 2.

Referring to FIG. 4, the lens unit 210 of the image conversion sheet 200 includes a bottom face and a curved face. The bottom face may be a face parallel with an upper portion of the display panel 100. The curved face may be protruded from the bottom face in a third direction which is a perpendicular direction to the first and second directions. The image displaying the first to ninth patterns may be divided by the curved face of the lens unit 210, and thus a plurality of divided images may be transmitted to a plurality of the viewpoints V1, V2, V3, V4, V5, V6, V7, V8, and V9.

The lens unit 210 may include a lens axis Ax in the first direction D1. The direction of the lens axis Ax may be substantially the same as the first direction D1. The lens axis Ax may be perpendicularly disposed with the light-blocking pattern BL formed at a boundary portion of the first pixel unit P1 and the second pixel unit P2.

The curved face of the lens unit 210 may be symmetric based on the lens axis Ax.

The image conversion sheet 200 may be formed using a polymeric resin. For example, the polymeric resin may include acrylic resin.

Figure 5:
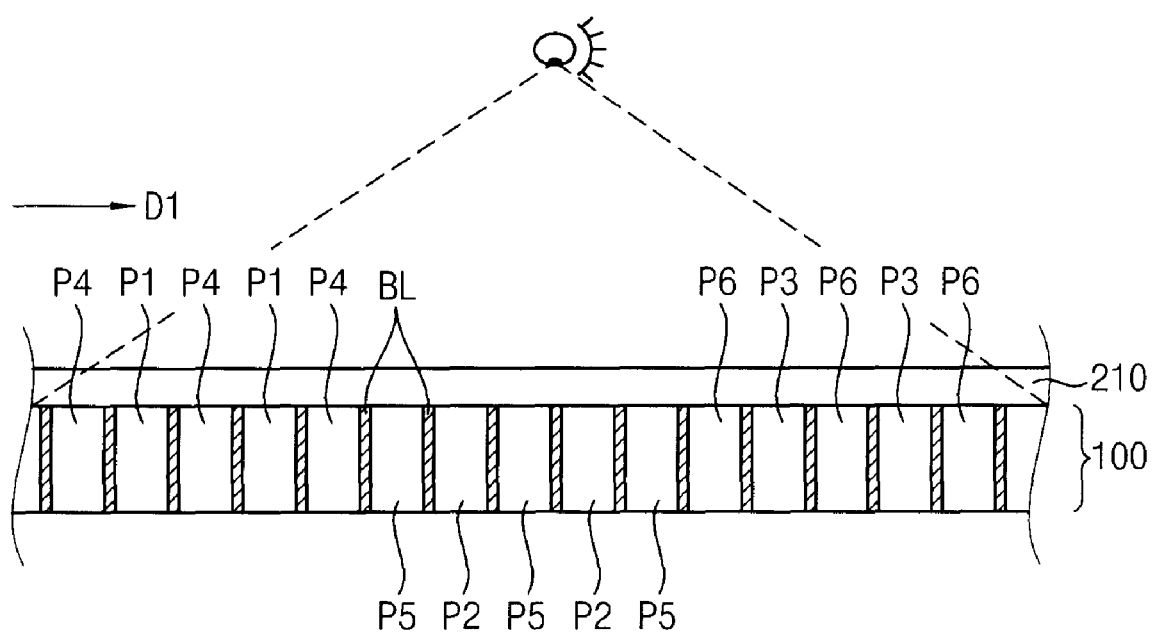
FIG. 5 is a cross-sectional view taken along line II-II' in FIG. 2.

FIG. 5 is a cross-sectional view taken along line II-II' in FIG. 2. Referring to FIG. 5, the viewer may view the light-blocking pattern BL at a boundary portion between the first and second patterns in the stereoscopic image display apparatus 500 of an exemplary embodiment of the present invention. In addition, the viewer may view a portion of the first pattern including the first to third pixel units P1, P2, and P3 and a portion of the second pattern including the fourth to sixth pixel units P4, P5, and P6. The viewer may view a portion of the image at the boundary between the first and second patterns according to the first to sixth pixel units P1, P2, P3, P4, P5, and P6 having the zigzag shape.

According to an exemplary embodiment of the present invention, the viewer may view the image at the boundary portion when a viewing position of the viewer is changed, and then the viewer may continuously view the stereoscopic image displaying the display panel 100.

FIG. 6 is a plan view showing an exemplary embodiment in accordance with a pixel unit shown in FIG. 2.

Referring to FIG. 6, the pixel unit of an exemplary embodiment of the present invention may include a liquid crystal capacitor, a switching element, and a storage capacitor. The liquid crystal capacitor may include the liquid crystal layer 130, a pixel electrode PE, and a common electrode (not shown). The pixel unit may include a color filter CF.

The pixel electrode PE may be formed in the first direction D1 of the display panel 100. The pixel electrode PE may have the zigzag shape. The shape of the pixel unit may be defined by the shape of the pixel electrode PE. The shape of the pixel unit may be defined by the shape of the color filter CF depending on the shape of the pixel electrode PE.

The common electrode may be formed facing the pixel electrode PE. For example, the pixel electrode PE may be formed on a first base substrate (not shown) of the display substrate 110, and the common electrode may be formed on a second base substrate (not shown) of the opposite substrate 120. The common electrode may include a cutting portion having a zigzag shape corresponding to a center portion of the pixel electrode PE.

The liquid crystal layer 130 may be disposed between the pixel electrode PE and the common electrode.

A black matrix pattern BM may be formed on a boundary portion between adjacent pixel units. The black matrix pattern BM may include an opening portion corresponding to each pixel unit. The pixel electrode PE may correspond to the opening portion of the black matrix pattern BM. The color filter CF may correspond to the opening portion of the black matrix pattern BM. The black matrix pattern BM may be formed on the second base substrate.

Referring to FIG. 2, the black matrix pattern BM may extend in the first direction D1 and have a zigzag shape. The black matrix pattern BM may be formed between the first pixel unit P1 and the fourth pixel unit P4. Moreover, the black matrix pattern BM may extend in the second direction D2. The black matrix pattern BM may be formed between the first pixel unit P1 and the second pixel unit P2. Thus, the black matrix pattern BM may serve as the light-blocking pattern BL.

A light-blocking pattern LBP may be formed on the outside of the pixel electrode PE. The light-blocking pattern LBP may prevent light leakage. The light-blocking pattern LBP may correspond to the black matrix pattern BM.

Gate lines GL1 and GL2 and data lines DL1 and DL2, which cross the gate lines GL1 and GL2, may be formed on the first base substrate.

The gate lines GL1 and GL2 may extend in the second direction D2. The gate lines GL1 and GL2 may correspond to the black matrix pattern BM. A first gate line GL1 may be disposed at one edge portion of the pixel electrode PE. A second gate line GL2 may be disposed in the first direction D1 from the first gate line GL1 and parallel to the first gate line GL1. The second gate line GL2 may be disposed at another edge portion of the pixel electrode PE. Both of the edge portions may face each other in the first direction D1.

A portion of a first data line DL1 may be overlapped with the pixel electrode PE. A portion of a second data line DL2 may be overlapped with the pixel electrode PE. The second data line DL2 may be disposed in the second direction D2, parallel to the first data line DL1.

Each of the first and second data lines DL1 and DL2 may include a first straight line portion SL1, a second straight line portion SL2, and a slanted portion CL.

The first straight line portion SL1 may cross the first gate line GL1 or the second gate line GL2. The first straight line portion SL1 may extend in the first direction D1. A portion of the first straight line portion SL1 may be overlapped with the pixel electrode PE.

The second straight line portion SL2 may be spaced apart from the first straight line portion SL1, in the second direction D2. The first straight line portion SL1 and second straight line portion SL2 are parallel. A portion of the second straight line portion SL2 may be overlapped with the pixel electrode PE.

The slanted portion CL may extend at a slant based on the first direction D1. The slanted portion CL may connect the first straight line portion SL1 and the second straight line portion SL2. An extending direction of the slanted portion CL may be parallel with one direction selected from zigzag directions of the pixel electrode PE. The slanted portion CL may be parallel with the pixel electrode PE. The slanted portion CL of the first data line DL1 may be entirely overlapped with the pixel electrode PE. The slanted portion CL of the second data line DL2 may be entirely overlapped with another pixel electrode adjacent to the pixel electrode PE and disposed in the second direction D2 of the pixel electrode PE.

The switching element TFT may be connected to the second gate line GL2 and the first data line DL1. The switching element TFT may include a gate electrode GE connected to the second gate line GL2, a source electrode SE connected to the first data line DL1, and a drain electrode DE spaced apart from the source electrode SE. A contact portion CNT connected to the drain electrode DE may contact the pixel electrode PE, and thus the switching element TFT may be connected to the pixel electrode PE.

The storage capacitor may include the pixel electrode PE, a storage line STL overlapped with the pixel electrode PE, and an insulation layer (not shown) disposed between the pixel electrode PE and the storage line STL. A portion of the storage line STL overlapped with the pixel electrode PE may serve as a first electrode of the storage capacitor, and a portion of the pixel electrode PE may serve as a second electrode of the storage capacitor. The insulation layer may serve as a dielectric substance disposed between the first and second electrodes. Thus, the storage capacitor may charge a voltage applied in the pixel electrode PE.

Figure 7:
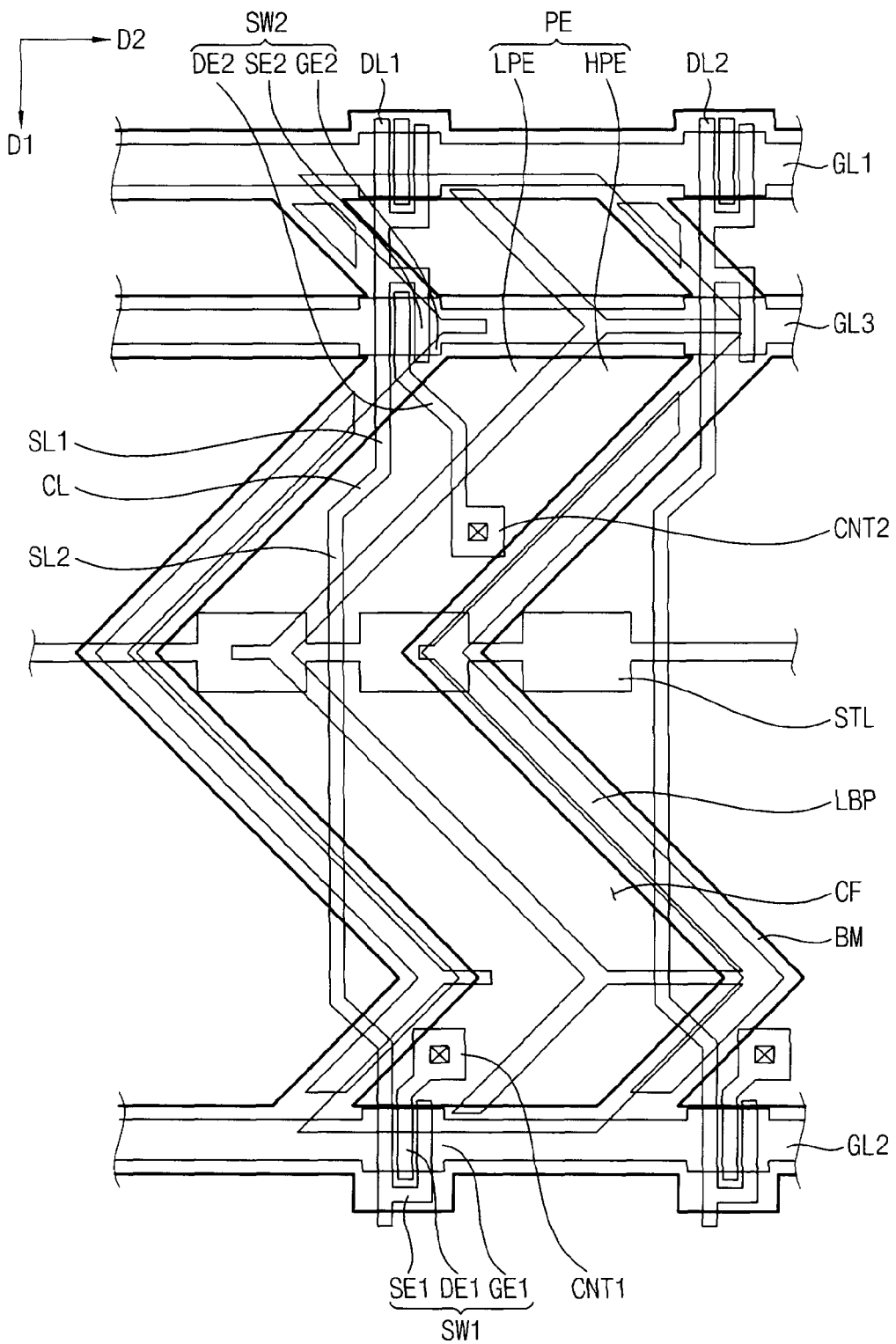
FIG. 7 is a plan view showing another exemplary embodiment in accordance with a pixel unit shown FIG. 2.

FIG. 7 is a plan view showing another exemplary embodiment in accordance with a pixel unit shown FIG. 2. A pixel unit of another exemplary embodiment in FIG. 7 is substantially the same as the pixel unit of the exemplary embodiment in FIG. 6, except for a pixel electrode PE, switching elements SW1 and SW2, and gate lines GL1, GL2, and GL3. Thus, any further description will be omitted.

Referring to FIG. 7, the pixel unit of another exemplary embodiment may include a pixel electrode PE, switching elements SW1 and SW2 connected to the pixel electrode PE, and a color filter CF.

The pixel electrode PE may have a zigzag shape extending in the first direction D1. The black matrix pattern BM may be formed along the outside of the pixel electrode PE to have a zigzag shape being substantially the same as the shape of the pixel electrode PE.

The pixel electrode PE may include a first sub-electrode LPE and a second sub-electrode HPE. For example, the second sub-electrode HPE may have a V-shape, and the first sub-electrode LPE may have a W-shape surrounding the outside of the second sub-electrode HPE.

The gate lines GL1, GL2, and GL3 may extend in the first direction D1. The gate lines GL1, GL2, and GL3 may be arranged in parallel in the second direction D2. The gate lines GL1, GL2, and GL3 may include a first gate line GL1, a second gate line GL2, and a third gate line GL3.

The first gate line GL1 may be disposed at a first edge of the first sub-electrode LPE. The second gate line GL2 may be disposed at a second edge of the first sub-electrode LPE that opposes the first edge. The third gate line GL3 may be disposed between the first gate line GL1 and the second gate line GL2. The third gate line GL3 may be overlapped with the second sub-electrode HPE.

The switching elements SW1 and SW2 may include a first transistor SW1 and a second transistor SW2.

The first transistor SW1 may be connected to the second gate line GL2 and the first data line DL1. The first transistor SW1 may include a first gate electrode GE1 connected to the second gate line GL2, a first source electrode SE1 connected to the first data line DL1, and a first drain electrode DE1 spaced apart from the first source electrode SE1. A first contact portion CNT1 connected to the first drain electrode DE1 may contact the first sub-electrode LPE to connect the first transistor SW1 and the first sub-electrode LPE.

The second transistor SW2 may be connected to the third gate line GL3 and the first data line DL1. The second transistor SW2 may include a second gate electrode GE2 connected to the third gate line GL3, a second source electrode SE2 connected to the first data line DL1, and a second drain electrode DE2 spaced apart from the second source electrode SE2. A second contact portion CNT2 connected to the second drain electrode DE2 may contact the second sub-electrode HPE to connect the second transistor SW2 and the second sub-electrode HPE.

Hereinafter, an exemplary embodiment of the present invention for improving luminance and minimizing crosstalk will be shown referring to FIG. 8A, FIG. 8B, FIG. 9A, FIG. 9B, FIG. 10A, and FIG. 10B.

Figure 8A:
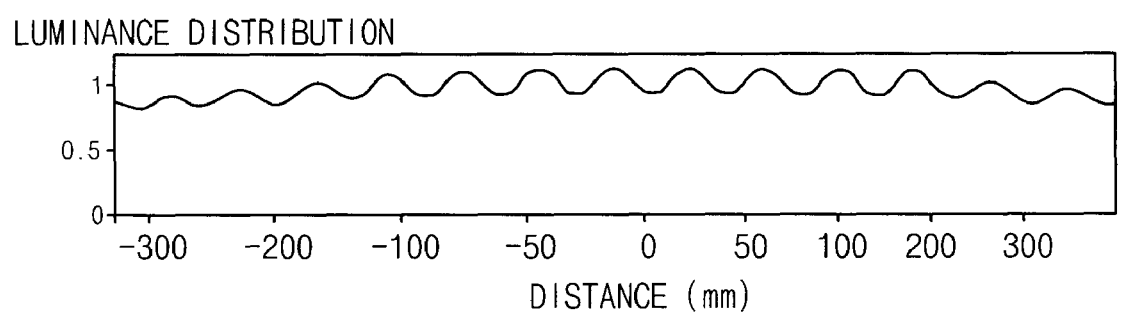
FIG. 8A and FIG. 8B are graphs showing a luminance distribution and a crosstalk distribution according to viewpoints of the stereoscopic image display apparatus including a display panel having the pixel unit shown in FIG. 7.
Figure 8B:
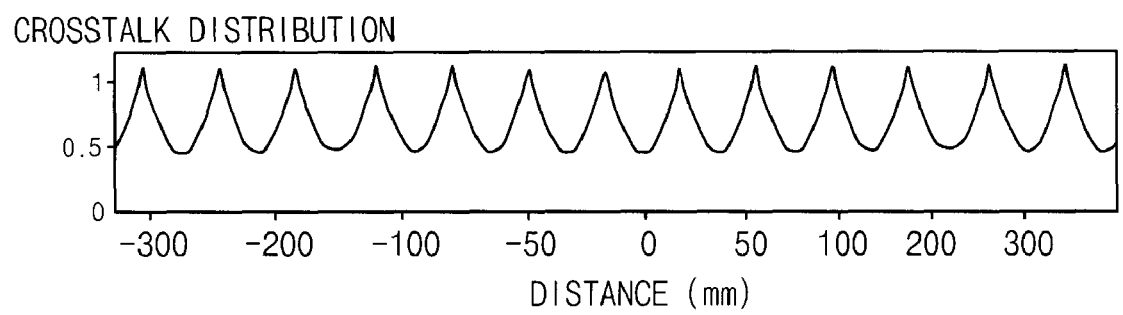
Figure 9A:
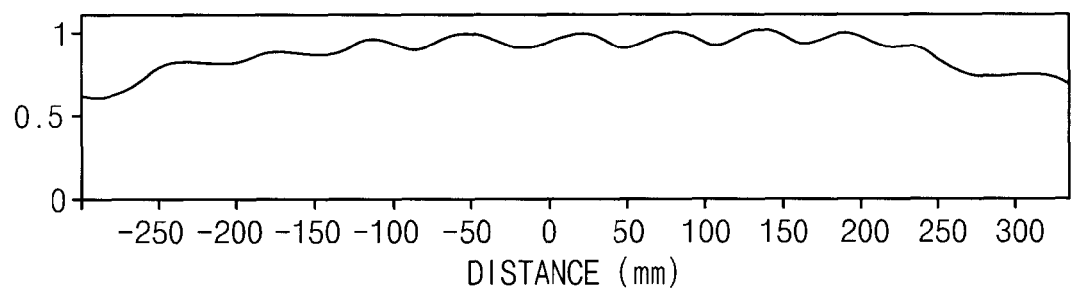
FIG. 9A and FIG. 9B are graphs showing a luminance distribution and a crosstalk distribution in a stereoscopic image display apparatus according to viewpoints of Comparative Embodiment 1.
Figure 9B:
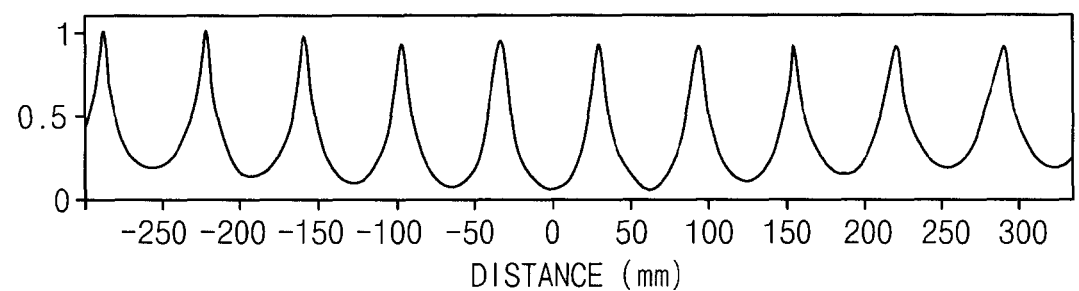
Figure 10A:
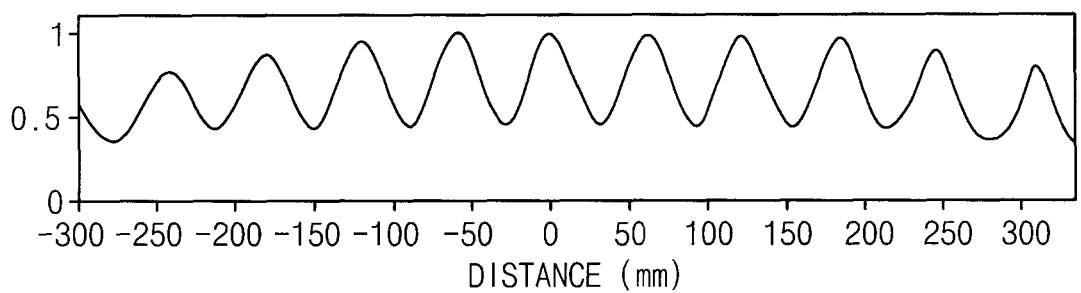
FIG. 10A and FIG. 10B are graphs showing a luminance distribution and a crosstalk distribution in a stereoscopic image display apparatus according to viewpoints of Comparative Embodiment 2.
Figure 10B:
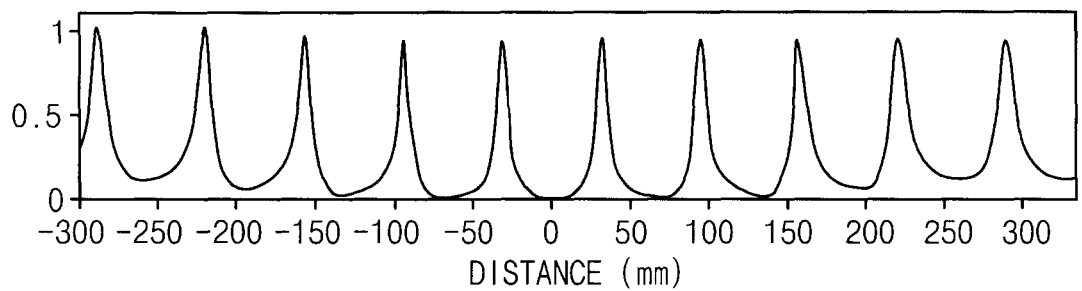

In FIG. 8A, FIG. 8B, FIG. 9A, FIG. 9B, FIG. 10A, and FIG. 10B, an x-axis is represented as a distance in millimeters (mm). "0" represents a front face of a display panel, a negative distance represents a left side based on the front face, and a positive distance represents a right side based on the front face, along the x-axis. FIG. 8A, FIG. 9A, and FIG. 10A are graphs showing a luminance distribution. FIG. 8B, FIG. 9B, and FIG. 10B are graphs showing a crosstalk distribution. In the luminance distribution, "1" represents a luminance value when the display panel is the brightest, "0" represents a luminance value when the display panel is the darkest, and a plurality of values in a range of about 0 to about 1 represent relative luminance values. In the crosstalk distribution, "1" represents a value when severe crosstalk is generated, "0" represents a value when crosstalk is hardly generated, and a plurality of values in a range of about 0 to about 1 represent relative values. The more near an average value of the luminance distribution may be about "1", the more uniform the luminance of the display apparatus may be. The more near an average value of the crosstalk distribution may be about "0", the more difficult the generation of the crosstalk in the display apparatus may be.

FIG. 8A and FIG. 8B are graphs showing a luminance distribution and a crosstalk distribution according to viewpoints of the stereoscopic image display apparatus including a display panel having the pixel unit shown in FIG. 7.

Referring to FIG. 8A and FIG. 8B, the luminance values are uniformly distributed at about 1, except for a range between about −200 mm to about −300 mm and about 200 mm to about 300 mm (not shown). An average value of the luminance distribution is about 0.89. An average value of the crosstalk distribution is about 0.35.

FIG. 9A and FIG. 9B are graphs showing a luminance distribution and a crosstalk distribution in a stereoscopic image display apparatus according to viewpoints of Comparative Embodiment 1.

A stereoscopic image display apparatus of Comparative Embodiment 1 is a first stereoscopic image display apparatus including a display panel which includes a pixel unit having a rectangular shape, and a slanted lens corresponding to the pixel unit having the rectangular shape.

Referring to FIG. 9A and FIG. 9B, in the first stereoscopic image display apparatus, the luminance values are uniformly distributed at about 1. An average of the luminance distribution is about 0.93. An average of the crosstalk distribution is about 0.63, and then crosstalk is generated throughout the entire first stereoscopic image display apparatus.

FIG. 10A and FIG. 10B are graphs illustrating a luminance distribution and a crosstalk distribution in a stereoscopic image display apparatus according to viewpoints of Comparative Embodiment 2.

A stereoscopic image display apparatus of Comparative Embodiment 2 is a second stereoscopic image display apparatus including a display panel which includes a pixel unit having a rectangular shape, and a vertical lens corresponding to the pixel unit having the rectangular shape.

Referring to FIG. 10A and FIG. 10B, in the luminance distribution of the second stereoscopic image display apparatus, a changed width is wider in a range of about 0.4 to about 1, and an average of the luminance distribution is about 0.73. Comparing with FIG. 9A, the luminance distribution of the second stereoscopic image display apparatus using the vertical lens is lower than that of the first stereoscopic image display apparatus using the slanted lens. An average of the crosstalk distribution is about 0.21 in the second stereoscopic image display apparatus. Compared with FIG. 9B, the crosstalk distribution of the second stereoscopic image display apparatus is better than that of the first stereoscopic image display apparatus.

According to the stereoscopic image display apparatus of an exemplary embodiment of the present invention, the luminance distribution of the exemplary embodiment is more uniform than the first and the second stereoscopic image display apparatuses in the Comparative Embodiments, and the crosstalk distribution of the exemplary embodiment is substantially the same level as that of the second stereoscopic image display apparatus in Comparative Embodiment 2.

According to an exemplary embodiment of the present invention, a luminance distribution may be uniform despite using vertical lenses having a lens axis corresponding to an arrangement direction of the pixel units. The crosstalk distribution of an exemplary embodiment of the present invention may be substantially the same level as that of the second stereoscopic image display apparatus.

The viewer may not view the entire light-blocking pattern BL, which is formed in an area where an image is not displayed on the display panel, but partially view the light-blocking pattern BL according to the zigzag shape of the pixel unit. Thus, the viewer may view a continuous image throughout the entire display panel when the viewing position of the viewer is changed, and the zigzag shape may prevent the viewing of a discontinuous stereoscopic image.

Figure 11:
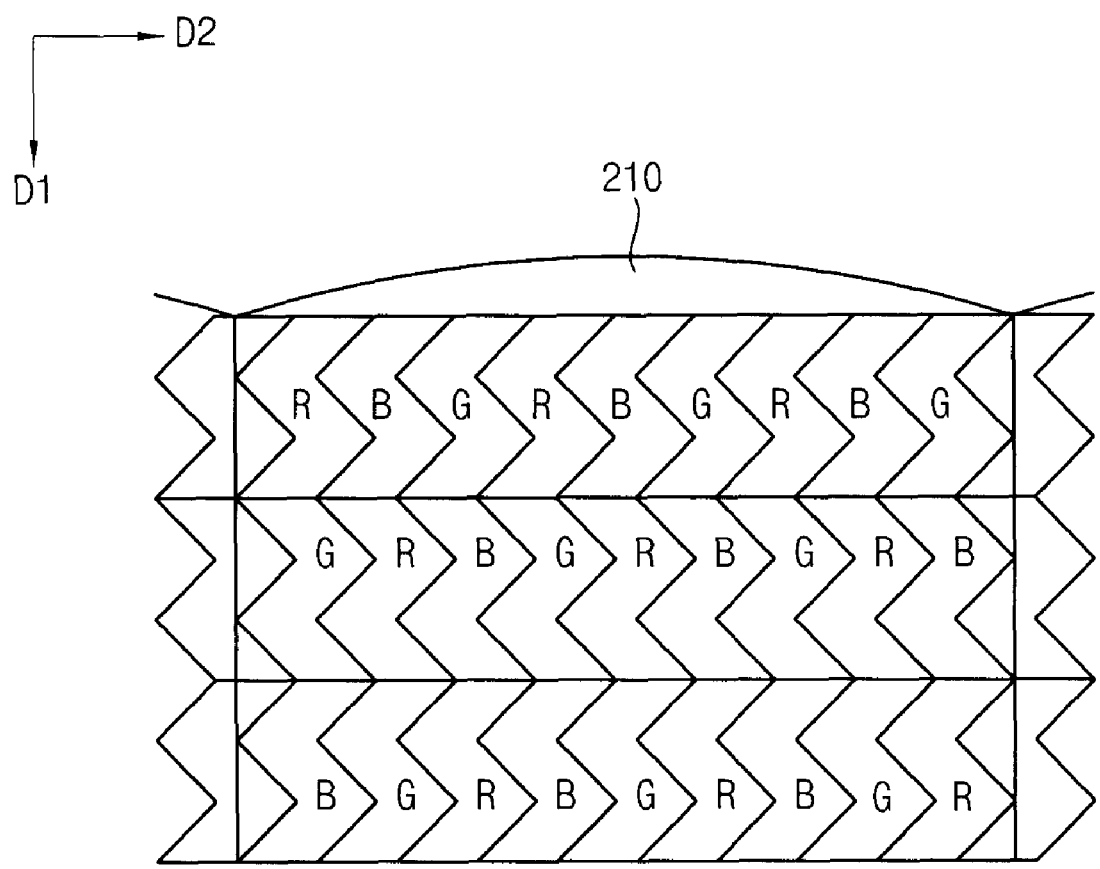
FIG. 11 is a plan view showing a pixel unit of a stereoscopic image display apparatus in accordance with another exemplary embodiment.

FIG. 11 is a plan view showing a pixel unit of a stereoscopic image display apparatus in accordance with another exemplary embodiment.

Referring to FIG. 11, a plurality of pixel units may have a zigzag shape extending in a first direction D1. A plurality of the pixel units may be arranged in a second direction D2 different from the first direction D1. Each pixel unit may have a Z-shape as a zigzag shape extending in the first direction D1. A stereoscopic image display apparatus may include a display panel including the pixel units having the Z-shape and a plurality of vertical lenses, and thus the luminance may be improved and the generation of crosstalk may be minimized.

The pixel units shown in FIG. 11, except for the shape of a pixel electrode and the shape of a black matrix pattern, is substantially the same as the pixel unit shown in FIG. 6 and FIG. 7. Thus, any further description will be omitted.

Although not shown in figures, a pixel unit may have a V-shape in some exemplary embodiments of the present invention. A stereoscopic image display apparatus may include a display panel including the pixel units having the V-shape and a plurality of vertical lenses, and thus the luminance may be improved and the generation of crosstalk may be minimized.

According to the stereoscopic image display apparatus of an exemplary embodiment of the present invention, elements extending in a perpendicular direction to an extending direction of a gate line may be decreased, by using a display panel including a plurality of pixel units, each of the pixel units having a zigzag shape, to minimize the generation of crosstalk. Moreover, by using lenses that do not block a backlight, decrease of luminance may be prevented, and the luminance may be uniform throughout the entire display panel. Thus, display quality may be improved.

The stereoscopic image display apparatus of the exemplary embodiments of the present invention may be applied to a liquid crystal display apparatus, a portable display player, a display apparatus including a plasma display panel (PDP), a flat panel display apparatus, a three-dimensional (3-D) stereoscopic image display apparatus, a 3-D television for broadcasting use, a 3-D display for military use, a 3-D display for simulation training use, a 3-D display for medical use, etc.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A stereoscopic image display apparatus, comprising:
    a display panel comprising a plurality of pixel units, each pixel unit comprising a zigzag shape that extends in a first direction; and
    an image conversion sheet comprising a plurality of lens units, each lens unit extending in the first direction, the lens units being arranged in a second direction different from the first direction, and the lens units being substantially parallel.

2. The stereoscopic image display apparatus of claim 1, wherein the lens unit is substantially symmetric based on a lens axis of the lens unit, and the lens axis extends in the first direction.

3. The stereoscopic image display apparatus of claim 1, wherein each lens unit comprises a curved face protruded from the display panel.

4. The stereoscopic image display apparatus of claim 1, wherein the pixel units comprise a first color pixel, a second color pixel, and a third color pixel that represents different colors, and the second and third color pixels are disposed at least one of above, below, to the left, or to the right of the first color pixel.

5. The stereoscopic image display apparatus of claim 4, wherein pixel units that represent the same color are slantingly disposed with each other based on the first direction.

6. The stereoscopic image display apparatus of claim 4, wherein the first pixel unit, the second pixel unit, and the third pixel unit are arranged in the first direction, in sequence.

7. The stereoscopic image display apparatus of claim 6, wherein the lens unit corresponds to a plurality of pixel units arranged in the second direction.

8. The stereoscopic image display apparatus of claim 7, wherein the lens unit corresponds to nine pixel units arranged in the second direction.

9. The stereoscopic image display apparatus of claim 1, wherein the display panel further comprises a light-blocking pattern arranged on a boundary region of the pixel units adjacent to each other, the light-blocking pattern comprising a zigzag shape.

10. The stereoscopic image display apparatus of claim 9, wherein the display panel further comprises a display substrate and an opposite substrate, and each pixel unit further comprises:
    a pixel electrode arranged on the display substrate, the pixel electrode comprising an outer side having a zigzag shape;
    a common electrode arranged on the opposite substrate; and
    a liquid crystal layer disposed between the display substrate and the opposite substrate.

11. The stereoscopic image display apparatus of claim 10, wherein the display substrate comprises:
    a plurality of data lines that extend in the first direction, a portion of a first data line partially overlaps with the pixel electrode; and a plurality of gate lines that extend in the second direction, the gate lines corresponding to the light-blocking pattern.

12. The stereoscopic image display apparatus of claim 11, wherein the first data line comprises:

a first straight line portion that extends in the first direction;

a second straight line portion disposed substantially in parallel with the first straight line portion, the second straight line portion being spaced apart from the first straight line portion; and a slanted portion that connects the first straight line portion with the second straight line portion, the slanted portion slantingly extending based on the first direction.

13. The stereoscopic image display apparatus of claim 12, wherein the slanted portion of the first data line is substantially parallel with the outer side of the pixel electrode.

14. The stereoscopic image display apparatus of claim 11, wherein the gate lines comprise:

a first gate line connected to the pixel electrode, the first gate line being disposed at a first edge of the pixel electrode; and a second gate line disposed at a second edge of the pixel electrode, the second gate line being adjacent to the first gate line.

15. The stereoscopic image display apparatus of claim 11, wherein the pixel electrode further comprises:

a first sub-electrode; and a second sub-electrode spaced apart from the first sub-electrode.

16. The stereoscopic image display apparatus of claim 15, wherein the gate lines comprise:

a first gate line disposed at a first edge of the first sub-electrode;

a second gate line disposed in the first direction from the first gate line, the second gate line being disposed at a second edge of the first sub-electrode; and a third gate line disposed between the first gate line and the second gate line, the third gate line overlapping with the second sub-electrode.

17. The stereoscopic image display apparatus of claim 9, wherein opposite edge portions of the lens unit, which are opposite to each other in the second direction, are partially overlapped with the pixel units.

* * * * *